(12) United States Patent
Kohler et al.

(10) Patent No.: US 6,602,482 B2
(45) Date of Patent: Aug. 5, 2003

(54) SEPARATION OF METAL CHLORIDES FROM THEIR SUSPENSIONS IN CHLOROSILANES

(75) Inventors: Bernd Kohler, Leckwitz (DE); Eberhard Schulz, Riesa (DE); Bernd Vendt, Oer-Erkenschwick (DE)

(73) Assignees: Degussa AG, Duesseldorf (DE); Wacker-Chemie GmbH, Munich (DE)

(*) Notice: Subject to any disclaimer, the term of this patent is extended or adjusted under 35 U.S.C. 154(b) by 11 days.

(21) Appl. No.: 09/883,317

(22) Filed: Jun. 19, 2001

(65) Prior Publication Data

US 2001/0053343 A1 Dec. 20, 2001

(30) Foreign Application Priority Data

Jun. 20, 2000 (DE) .......................... 100 30 252

(51) Int. Cl.[7] .............................. C08B 33/107
(52) U.S. Cl. ................. 423/342; 423/493; 423/495; 423/497
(58) Field of Search ................. 423/324, 341, 423/342, 343, 491, 493, 495, 497

(56) References Cited

U.S. PATENT DOCUMENTS

| | | | | |
|---|---|---|---|---|
| 1,633,835 A | * | 6/1927 | Wolcott | |
| 4,092,446 A | * | 5/1978 | Padovani et al. | 427/213 |
| 4,130,632 A | | 12/1978 | Braunsperger et al. | |
| 4,828,697 A | | 5/1989 | Kuhnt et al. | |
| 5,362,393 A | | 11/1994 | Kuhme | |

FOREIGN PATENT DOCUMENTS

| | | |
|---|---|---|
| DE | 628953 | 4/1936 |
| DE | 629 853 | 5/1936 |
| DE | 30 45 900 | 7/1982 |
| DE | 32 21 148 | 2/1983 |
| DE | 35 09 782 | 10/1986 |
| EP | 0 054 650 | 6/1982 |
| GB | 627904 | * 8/1949 |
| GB | 1028901 | 5/1966 |

* cited by examiner

Primary Examiner—Steven Bos
Assistant Examiner—Anthnoy Kuhar
(74) Attorney, Agent, or Firm—Oblon, Spivak, McClelland, Maier & Neustadt, P.C.

(57) ABSTRACT

A process for separating metal chlorides from a suspension of metal chlorides in chlorosilanes, in which the suspension is filtered under pressure in the absence of air and moisture forming a filter cake, which is granulated and passed to a dissolution zone where the metal chlorides are dissolved to form an aqueous metal chloride solution. The invention also relates to a filtration and dissolution apparatus for this process, and to an apparatus for introducing the crude reaction gas into a circulated suspension of metal chlorides in chlorosilanes, thus producing a feedstock for the process.

14 Claims, 3 Drawing Sheets

SEPARATION OF METAL CHLORIDES FROM THEIR SUSPENSIONS IN CHLOROSILANES

BACKGROUND OF THE INVENTION

1. Field of the Invention

The invention relates to a process for separating metal chlorides from their suspensions in chlorosilanes, which are obtained in the condensation of gaseous reaction mixtures comprising metal chlorides from the reaction of technical-grade silicon and hydrogen chloride, and to the further treatment of the metal chlorides to give a solution of metal chlorides in aqueous hydrochloric acid. The invention further relates to a filtration and dissolution apparatus for separating the suspension of metal chlorides in chlorosilanes and for the further treatment of the metal chlorides which have been separated off.

2. Discussion of the Background

It is known that technical-grade silicon, containing metallic impurities, can be reacted with hydrogen chloride at temperatures of from 270° to 1,000° C. both in fixed-bed reactors and in fluidized-bed reactors to form chlorosilanes. This process gives a gaseous reaction mixture which consists predominantly, depending on the reaction temperature, of a mixture of trichlorosilane and tetrachlorosilane (silicon tetrachloride). The metallic impurities in the silicon, mainly iron, aluminum and calcium, are converted into the corresponding chlorides. A part of these chlorides is carried from the reactor together with fine silicon dust whose amount varies greatly depending on the reactor type and throughput, and is deposited in cyclones or filtration units located downstream of the reactor. In particular, calcium chloride and iron chloride are predominantly deposited as solid metal chlorides on the fine silicon particles upon cooling of the gaseous reaction mixture, and can thus easily be carried out with the dust. The remainder of the metal chlorides, predominantly aluminum chloride, remains in vapor form in the cooled gaseous reaction mixture.

Aluminum chloride in particular tends to be deposited in solid form in pipes, on cooling surfaces or other equipment surfaces at temperatures below about 180° C., which have to be employed for condensing the chlorosilanes under atmospheric pressure. The prior art therefore provides various solutions for carrying out the condensation of the chlorosilanes in a trouble-free manner despite this tendency for deposition of solid, and to separate off the aluminum chloride present as elegantly as possible. In a known process, a first condensation stage is carried out using indirect cooling, usually by means of cooling water as the cooling medium, in upright shell-and-tube heat exchangers through which the gaseous reaction mixture comprising metal chlorides flows from the bottom upward. The condensate which flows downward is supposed to flush away the metal chloride which is precipitated as a solid and keep the heat-exchange surfaces free. To avoid blockages at the gas inlet, "knock-off" devices are often installed at these particularly critical points so as to keep the flow cross-section free for as long as possible. The suspensions of metal chlorides in chlorosilanes formed by condensation have to be treated to separate off the metal chlorides.

In a further known process employing indirect cooling, the gaseous reaction mixture containing metal chlorides is passed through a simple double-walled condenser. This method also gives a suspension of metal chlorides in chlorosilanes from which the metal chlorides have to be separated off. However, part of the metal chlorides gradually forms a growing deposit on the cooling surfaces, as a result of which the flow cross-section is correspondingly reduced. When a particular fill level has been reached, the reaction mixture is switched over to a similar parallel condenser, the metal chloride deposit is removed by flushing with water and the condenser is subsequently dried. This operation is associated with frequent removal and reinstallation of the condenser, but still allows pseudocontinuous operation.

According to DE 629 853, the gaseous reaction mixture containing metal chlorides is passed into a melt which comprises an aluminum chloride/alkali metal chloride mixture and largely holds back aluminum chloride and iron chloride. The chlorosilanes are isolated by condensation of the vapors which are largely free of metal chlorides.

Finally, a continuous process is known in which the gaseous reaction mixture containing metal chlorides is passed into liquid chlorosilanes and the precipitated solid metal chlorides are separated from the liquid chlorosilanes. In a particular embodiment of this process, the gaseous reaction mixture containing metal chlorides (crude gas) having a temperature which may be about 300° C., for example, is brought into intimate contact with a vertically directed, finely divided stream of chlorosilanes. The chlorosilanes are advantageously the reaction product of the chlorosilane synthesis, which is used, for example, at a temperature of from 40 to 50° C. Part of the chlorosilanes (particularly the low-boiling trichlorosilane) is vaporized, the crude gas is appropriately cooled and the metal chlorides separate out as solids in the liquid chlorosilanes. The mixture of cooled crude gas and liquid chlorosilanes containing metal chlorides is passed to a separation vessel, from whose upper part the gas phase is taken off laden predominantly with relatively low-boiling chlorosilane vapors. From the bottom part of the separation vessel, part of the liquid chlorosilane phase enriched in the higher-boiling chlorosilanes and containing the suspended metal chlorides is taken off. The metal chlorides are separated off and the liquid phase is worked up by distillation to isolate the chlorosilanes. Another part of the liquid chlorosilane phase is introduced as runback into a column in which the entrained chlorosilanes are substantially scrubbed out from the abovementioned gas phase laden predominantly with relatively low-boiling chlorosilanes. From the remaining gas phase, the predominantly relatively low-boiling chlorosilanes, which are always still present therein in considerable amounts are condensed out by low-temperature cooling and part of them is worked up by distillation to isolate chlorosilanes; if desired together with the chlorosilane phase, if desired, which has been taken off from the lower part of the separation vessel and has been freed of metal chlorides, and the other part is returned as runback to the abovementioned column.

Most of the processes mentioned above give suspensions of metal chlorides in chlorosilanes from which the metal chlorides must be separated. The separation is made difficult by the fact that trichlorosilane is flammable in air and that all chlorosilanes are sensitive to hydrolysis. These problems also apply to the chlorosilanes that adhere to the metal chlorides which have been separated off. In addition, the hydration of aluminum chloride, which represents the main part of the metal chlorides, can occur in an explosive manner. Furthermore, for reasons of work safety, precautions must be taken to avoid emissions of chlorosilanes and hydrogen chloride. Although the process of DE 629 853 does not give suspensions of metal chlorides in chlorosilanes, it has the disadvantage that the melt frequently has to be replaced, for which purpose part of the circulated melt must be taken off continually or at frequent intervals and worked up.

SUMMARY OF THE INVENTION

Figure 1:
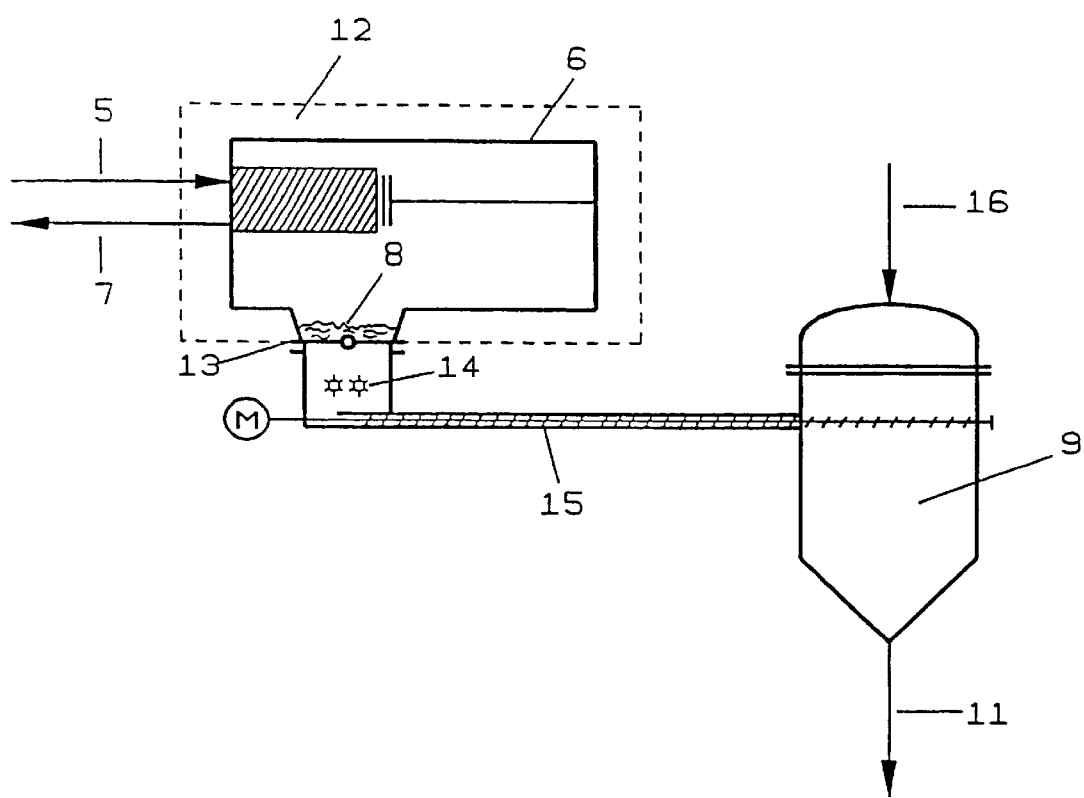
FIG. 1 schematically shows a plant in which the process of the invention for separating metal chlorides from their suspensions in chlorosilanes and the further treatment of the metal chlorides which have been separated off can be carried out.

It is an object of the invention to provide a process by which metal chlorides can be separated safely and reliably from their suspensions in chlorosilanes, which process requires no complicated replacement and work-up of metal salt melts.

The invention provides a process for separating metal chlorides from their suspensions in chlorosilanes, in which process the suspension is filtered under pressure in the absence of air and moisture in a zone which has been made inert, the filter cake is broken up in a zone which has been made inert, and the granulated filter cake is passed to a dissolution zone in which the metal chlorides are dissolved to form an aqueous metal chloride solution. A particularly suitable filtration apparatus for filtration under pressure is a candle filter or a filter press.

The invention also provides a filtration and dissolution apparatus by means of which solid metal chlorides suspended in liquid chlorosilanes are separated off in accordance with the invention and can be converted into an aqueous solution, which comprises a gastight filtration chamber 12; a filtration apparatus 6 enclosed therein; a feed line for the suspension 5; an outlet for liquid chlorosilanes 7; an inert gas lock 13; a granulator 14 for breaking up the filter cake 8; a conveying device 15 for the granulated filter cake; and a dissolution vessel 9 having a feed line 16 for water or hydrochloric acid and an outlet 11 for the acidic metal salt solution.

The invention further provides an embodiment in which the feedstock, i.e. the suspensions, are obtained from the hot, gaseous reaction mixture (crude gas) formed in the reaction of technical-grade silicon with hydrogen chloride by introducing the crude gas into a circulated suspension of metal chlorides in chlorosilanes and reducing the temperature of the crude gas from its introduction temperature to the temperature of the three-phase gas/liquid/solid mixture formed on introduction of the crude gas into the suspension partly by direct cooling resulting from vaporization of chlorosilanes and partly by indirect cooling.

The invention also provides an apparatus (or condenser) which can be used to introduce the crude gas into liquid chlorosilanes, comprising a hollow vessel 17 having a preferably cylindrical cross section and preferably a conical taper in the lower part; an external circulation pipe 18; a crude gas inlet port 19 fitted to the circulation pipe; a heat exchanger 20 located in the hollow vessel 17; an overflow port 21 and a gas offtake port 22.

DESCRIPTION OF THE PREFERRED EMBODIMENTS

An advantageous embodiment of the process of the invention comprises separating the solid metal chlorides from their suspension in liquid chlorosilanes by first filtering the suspension under pressure using a candle filter or in a filter press. Since trichlorosilane is flammable in air and all chlorosilanes are sensitive to hydrolysis, separation takes place in a zone which has been made inert. The filtration apparatus is thus located in a gastight chamber which excludes air and moisture and is filled with a dry inert gas such as nitrogen or argon during operation. The filtrate can be fractionated into the individual chlorosilanes by distillation.

The filter cake is generally of a fairly solid consistency. It is therefore advantageous to pass it via another zone or lock which has been made inert, to a granulation device. The lock separates the filtration chamber together with the filtration apparatus, which has to be kept free of moisture, from the subsequent zones in which absence of moisture is no longer necessary. The design of such locks is known to those skilled in the art.

The granulated filter cake is transported to a zone in which the metal salts are dissolved in water or dilute hydrochloric acid to form an aqueous metal salt solution which generally contains from 0.1 to 1.0% by weight of metal salt and can readily be passed to wastewater treatment.

The process of the invention can be carried out batchwise by introducing the suspension into the filtration apparatus, preferably a filter press, and filtering it until the filtration apparatus is full. The process can be carried out pseudocontinuously using alternate filtration apparatuses by introducing the suspension continuously into a first filtration apparatus until the latter is full and then switching over to a second filtration apparatus connected in parallel while the first is emptied.

Feedstocks employed are the suspensions of metal chlorides in chlorosilanes obtained by condensation from the hot gaseous reaction mixtures comprising metal chlorides (crude gas) in the reaction of technical-grade silicon with hydrogen chloride. Apart from relatively small amounts of iron (III) chloride and calcium chloride, they comprise mostly the relatively volatile aluminum chloride. The metal chloride content is generally from 0.1 to 8% by weight, based on chlorosilanes.

The suspensions of metal chlorides in chlorosilanes can be obtained in any desired way from the reaction gases of the chlorosilane synthesis. For example, it can be used for working up the suspensions of metal chlorides in chlorosilanes obtained by the process disclosed in simultaneously filed patent application DE 100 30 251, which involves condensation of the hot gaseous reaction mixtures comprising metal chlorides (crude gas) of the customary chlorosilane synthesis from technical-grade silicon and hydrogen chloride by passing the reaction mixtures into a suspension of metal chlorides in liquid chlorosilanes. This method for preparing a feedstock suitable for the process of the invention is comprehensively described below. However, the process of the invention is also suitable for separating suspensions of metal chlorides in liquid chlorosilanes which have been produced in any other way.

The process of the above patent application is generally carried out under atmospheric pressure or under superatmospheric pressure up to about 5 bar. The crude gas generally enters the process, if desired after precooling, at a temperature (introduction temperature) of from 135 to 200° C. It generally contains, depending on the reaction conditions of the chlorosilane synthesis, from 2 to 50% by weight of unreacted hydrogen chloride. The remainder is composed predominantly of hydrogen and chlorosilanes, among which trichlorosilane and tetrachlorosilane (silicon tetrachloride) in turn make up by far the major part. Furthermore, depending on the purity of the technical-grade silicon, from 0.1 to 8% by weight, based on the chlorosilanes, of metal chlorides consisting essentially of iron chloride, calcium chloride and in particular aluminum chloride are generally present. The crude gas can additionally contain unreacted silicon dust on which part of the metal chlorides is deposited. This silicon dust can be separated off dry in cyclones or filtration devices prior to the condensation step. If this step is omitted, the suspensions which can be used as feedstocks for the present process comprise not only the metal chlorides but also silicon dust. Silicon dust is generally present in the crude gases in amounts of from 1 to 5% by weight, based on chlorosilanes.

In the process of DE 100 30251 the crude gas is introduced into a suspension of metal chlorides in chlorosilanes. Trichlorosilane and tetrachlorosilane are by far the major reaction products of chlorosilane synthesis. The crude gas is advantageously introduced into the suspension at a high velocity, such a velocity that the linear velocity of the three-phase gas/liquid/solid mixture formed is at least 2 m/s and preferably from 2 to 8 m/s results. The circulation of the chlorosilanes can be effected by appropriately directed introduction of the crude gas (the system then operates according to the principle of an airlift pump) into the circulating liquid/solid mixture and of the resulting gas/liquid/solid mixture into the hollow vessel 17.

On introduction into the suspension of metal chlorides in liquid chlorosilanes, the crude gas is firstly cooled directly by vaporization, preferably of the relatively low-boiling chlorosilanes, in particular trichlorosilane, present in the circulated suspension of metal chlorides in liquid chlorosilanes. This results in condensation of part of the chlorosilanes present in the crude gas, in particular the relatively high-boiling silicon tetrachloride. Furthermore, the metal chlorides present in the crude gas separate out in solid form. The result is a three-phase mixture comprising a suspension of solids (metal chlorides and possibly silicon dust) in liquid chlorosilanes and the still gaseous constituents of the crude gas. This three-phase mixture then flows through a cooling zone having indirect cooling and subsequently separates into a gas phase comprising uncondensed chlorosilanes and the remaining gaseous constituents of the crude gas, plus a suspension of metal chlorides in chlorosilanes.

A boiling equilibrium exists in both cooling zones, so that the temperatures in the overall system, including the circulated suspension, are similar. When working under atmospheric pressure they are generally from 30 to 60° C. The excess heat content of the crude gas and the heat of condensation of the liquefied chlorosilanes are finally removed by the indirect cooling, i.e. passed to the cooling liquid, generally water. The necessary amount per unit time and the temperature of the cooling liquid are matched appropriately; they can be calculated without difficulty from the relevant parameters of the crude gas, of the cooling liquid and of the heat exchanger which effects the indirect cooling.

It is an important feature of the process of the above German patent application that the crude gas first comes into contact with liquid chlorosilanes (in which metal chlorides are suspended) and is directly cooled by vaporization, preferably of the low-boiling chlorosilanes, after which indirect cooling is carried out. Surprisingly, virtually no deposits of metal chlorides are formed on the cooling surfaces of the heat exchanger, let alone blockages, as occurs in the processes of the prior art which employ indirect cooling.

The gas phase separated from the suspension of metal chlorides in chlorosilanes still contains appreciable amounts of chlorosilanes, predominantly relatively volatile chlorosilanes, which can be condensed in a customary manner by single-stage or multistage cooling to temperatures as low as −70° C. and separated off. The remaining hydrogen chloride can be absorbed in water to form hydrochloric acid or be worked up in a customary manner by subsequent compression/condensation and distillation to give reusable hydrogen chloride. The hydrogen can be flared or employed for energy generation.

Owing to the density difference between the gas phase and the suspension of metal chlorides in chlorosilanes, the gas phase and suspension separate when the three-phase mixture mentioned enters the hollow vessel of the condenser and part of the suspension can be returned essentially without gaseous constituents to the introduction point of the crude gas. The metal chloride content of this suspension can vary within wide limits and is generally from 0.1 to 8% by weight. The suspension is, as mentioned above, advantageously recirculated at a linear velocity of from 2 to 8 m/s, as a result of which deposition of metal chlorides in the external circulation pipe 18 is avoided. The linear velocity can, as described above, be controlled by the amount of crude gas introduced per unit time and its introduction velocity.

According to the process of the invention, the other part of the suspension is separated into metal chlorides and chlorosilanes, as described above.

Description of the Plants, the Apparatuses and Equipment Items

FIG. 1 illustrates a possible embodiment of a filtration and dissolution apparatus for carrying out the process of the invention. In the gastight filtration chamber 12, there is, as filtration apparatus 6, a filter press to which the suspension of metal chlorides in chlorosilanes is fed as feed 5. Suitable filter presses are commercially available. In practice, the BHS Autopress from BHS, 87527 Sonthofen, Federal Republic of Germany, has been found to be useful. It has vertical, plate-shaped filter elements and is provided for the purposes of the invention with woven stainless steel mesh as filter material. The suspension is pumped into the spaces between the plates and the metal chlorides are collected on the outer sides of the filter plates, while the chlorosilanes flow out as filtrate between spacers arranged between the filter plates and leave the filtration apparatus via the outlet 7. When the filter cake has filled the intermediate spaces between the plates, it is pressed and subsequently discharged from the interior of the filter plates by inert gas pressure. In the case of the BHS press, all steps occur automatically.

The discharged filter cake 8, which is quite solid as a result of pressing, is firstly passed via a lock 13 which has been made inert to a granulator 14. Suitable granulators are, for example, pin rolls. The granulated metal chloride is conveyed by means of a screw conveyor 15 to a dissolution vessel 9 which is a stirred vessel which can be supplied with water or dilute hydrochloric acid via the feed line 16. The resulting acidic metal salt solution is taken from the dissolution vessel 9 via the outlet 11 and can readily be passed to wastewater treatment.

Figure 2:
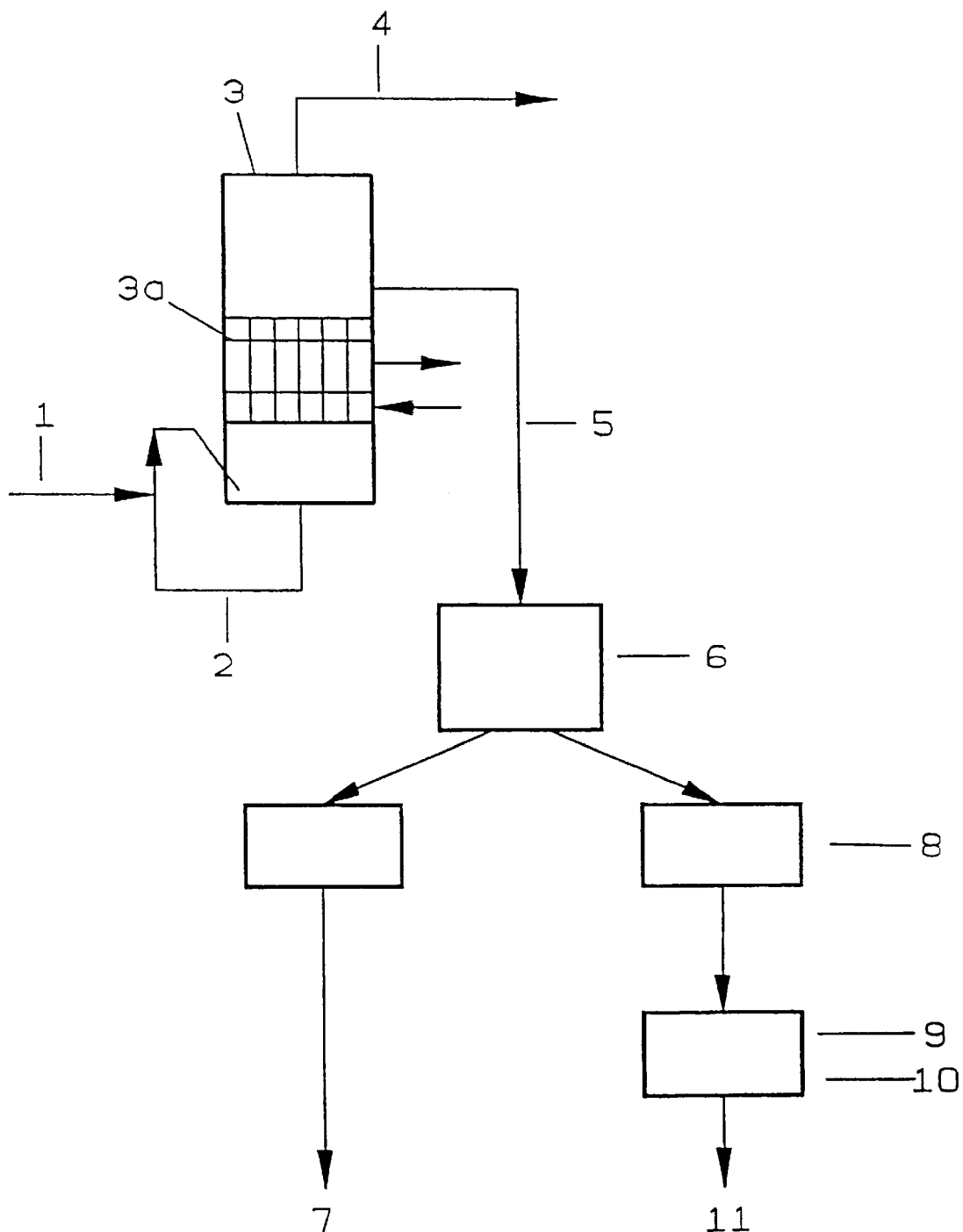
FIG. 2 shows a block diagram of a plant in which a feedstock of the process of the invention, namely a suspension of metal chlorides in chlorosilanes, is obtained by condensation from crude gases from the synthesis of chlorosilane by reaction of technical-grade silicon with hydrogen chloride and the metal chlorides are separated off and treated further according to the invention.

FIG. 2 shows the schematic flow diagram of a plant which includes the advantageous production of the feedstock in accordance with the simultaneously filed patent application DE 100 30 251 and its work-up by the process of the invention. The crude gas 1 from the chlorosilane synthesis is introduced into the suspension of metal chlorides in liquid chlorosilanes which circulates in a circuit 2 located partly outside and partly within the condensation zone 3. In a heat exchanger 3a within the condensation zone 3, the three-phase mixture formed by introduction of the crude gas and comprising a suspension of metal chlorides in chlorosilane together with uncondensed gaseous constituents of the crude gas 1 is cooled indirectly by means of cooling water. In the upper part of the condensation zone 3, the still gaseous constituents 4 of the crude gas 1 separate from the suspension. The chlorosilanes present in the gaseous material 4 are separated off by low-temperature condensation (not shown).

The overflow 5 is the part of the suspension of metal chlorides in chlorosilanes which is worked up according to the invention to isolate chlorosilanes. It is passed to the solid/liquid separation 6. The liquid phase 7 (chlorosilanes) is fractionated into the various chlorosilanes by distillation (not shown), advantageously together with the chlorosilanes recovered by low-temperature condensation. The solid phase 8 (metal chlorides) goes to the dissolution zone 9 where it is introduced into water or aqueous hydrochloric acid 10. The aqueous solution of the metal salt 11 is passed to wastewater treatment. An advantageous embodiment of the novel work-up of the overflow 5 is shown in FIG. 1. The overflow 5 of FIG. 2 is the feed 5 of FIG. 1.

Figure 3:
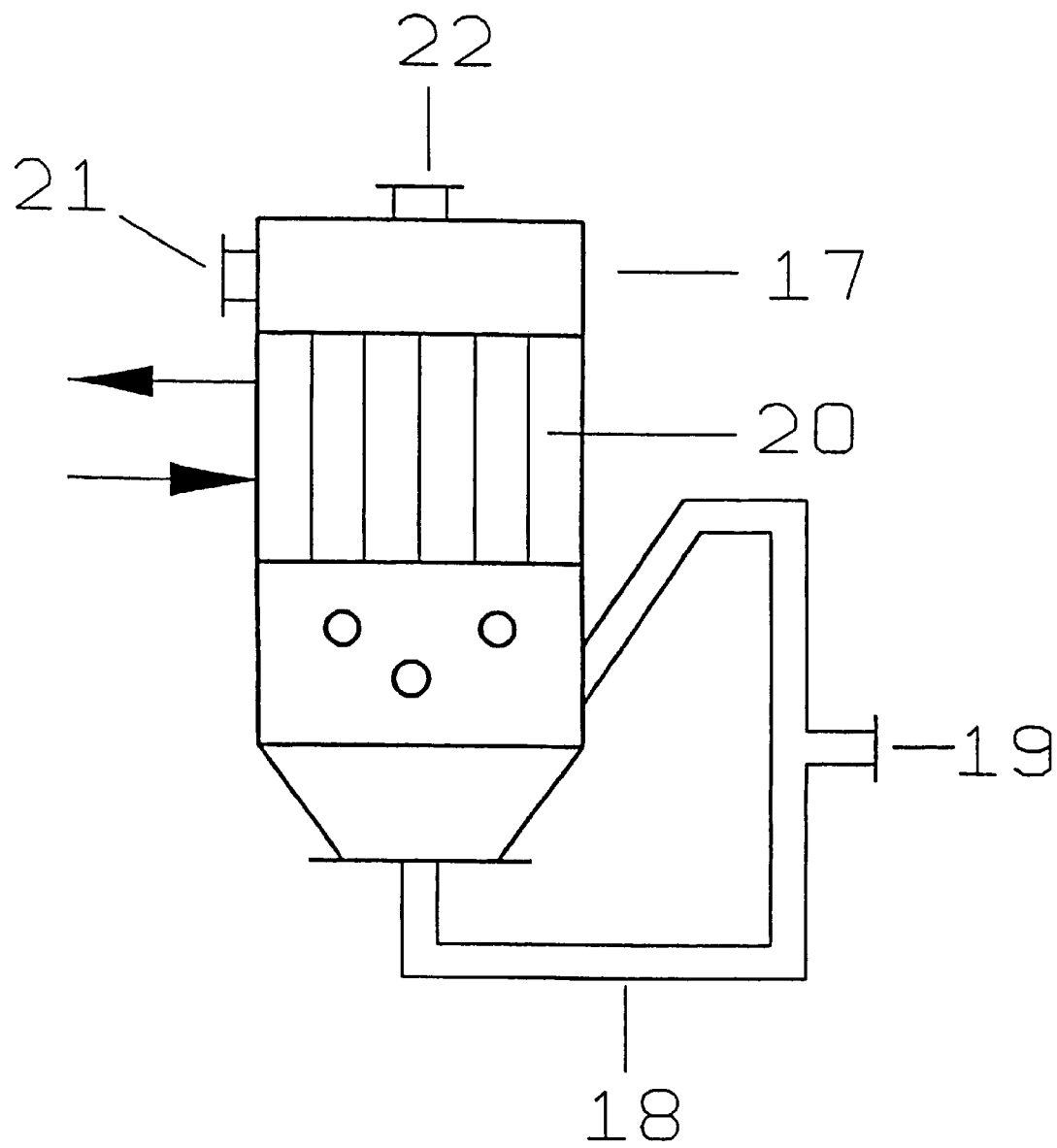
FIG. 3 shows an apparatus (or condenser) in which a substep of the process outlined in FIG. 2, namely the introduction of the crude gas into a suspension of metal chlorides in liquid chlorosilane leading to feedstocks for the process of the invention, is carried out.

FIG. 3 shows an apparatus (or condenser) which is used in the production of the feedstock for the process of the invention in accordance with the simultaneously filed patent application DE 100 30 251. In the apparatus the crude gas is introduced into the suspension of metal chlorides in chlorosilanes. It comprises a hollow vessel 17 having a preferably cylindrical cross section and preferably a conical taper in the lower part. This hollow vessel can, like the other parts of the apparatus, be made of carbon steel. The hollow vessel is provided with an external circulation pipe 18 in which a suspension of metal chlorides in chlorosilanes circulates. The circulation pipe 18 is provided with an inlet port 19 for the crude gas which drives the circulation. The heat exchanger 20 is located in the hollow vessel 17 and cools the three-phase mixture which enters the hollow vessel 17 from the circuit by means of cooling water. In the upper part of the hollow vessel, gas and suspension separate.

The suspension leaves the hollow vessel via the overflow port 21 and the gas phase goes out via the gas offtake port 22.

The following examples are intended to illustrate the invention without limiting its scope.

EXAMPLE 1

The process is carried out using a plant as shown in FIG. 2, which comprises a filtration and dissolution apparatus according to the invention as shown in FIG. 1 and a condenser as shown in FIG. 3. The crude gas 1 from a chlorosilane synthesis from technical-grade silicon and hydrogen chloride, which is at 135° C. and has a metal chloride content of 1.05 kg per 1,000 kg of chlorosilane, is introduced into the liquid suspension 2 of metal chloride in chlorosilanes, which is at a temperature of 35° C. The three-phase mixture of the suspension of metal chlorides in liquid chlorosilane and uncondensed constituents of the crude gas flows into condenser 3 through the heat exchanger 20, which is cooled by means of water at 23° C. and has a temperature of 23° C. at its upper end. There, the uncondensed constituents 4 of the crude gas 1 leave and the chlorosilanes present therein are condensed by low-temperature cooling down to −70° C.

The overflow 5 consisting of the suspension of metal chlorides in chlorosilanes and having a metal chloride content of 2.0 kg per 1,000 kg of chlorosilanes goes, at a temperature of 34° C., to the encapsulated filter press 6 which has been made inert by means of nitrogen. The filter cake 8 obtained there has a metal chloride content of 51% by weight and is passed via the solids lock 13, the granulator 14 and the screw conveyor 15 to the dissolution vessel 9 which is supplied with about 1 cubic meter/h of water. The resulting aqueous metal salt solution has a metal chloride content of 0.30% by weight, a hydrogen chloride content of 0.23% by weight and contains small amounts of hydrolysis products of the chlorosilanes which were present in the filter cake. It is passed to wastewater treatment.

The filtrate 7 together with the chlorosilanes separated out from the uncondensed proportion 4 of the gas mixture 1 by low-temperature cooling is worked up by distillation.

Only a low level of deposits are present on the cooling surfaces and other parts of the plant even after prolonged operations, and these deposits do not impair the function of the plant.

EXAMPLE 2

The process is carried out essentially as described in example 1. However, the crude gas 1 is at a temperature of 145° C. and contains about 24 kg of metal chlorides and about 30 kg of unreacted silicon dust per 1,000 kg of chlorosilanes. The suspension of metal chlorides in chlorosilanes into which the crude gas is introduced after dry filtration has a temperature of 43° C. The crude gas is cooled to 46° C. within less than 1 second by direct cooling with the liquid chlorosilane. For this purpose, the cooling zone of the condenser 3 flooded with the suspension is supplied with 6 cubic meters/h of cooling water at 21° C.

The overflowing suspension 5 has a metal chloride content of 1.4 kg per 1,000 kg of chlorosilane and a temperature of 46° C. It is passed to a filter press 6 from which a filter cake 8 having a metal chloride content of about 85% by weight is ejected periodically. The filter cake is conveyed as described in example 1 to the dissolution vessel 9 which is supplied with 1 cubic meter/h of water. The resulting aqueous solution, which has a metal chloride content of 0.24% by weight and a hydrogen chloride content of 0.04% by weight, is passed to a wastewater treatment plant.

The filtrate 7 together with the chlorosilanes separated out from the uncondensed proportion 4 of the crude gas 1 by multistage low-temperature condensation (down to −53° C.) is worked up by distillation.

Priority application DE 100 30 2521, filed Jun. 20, 2000, is hereby incorporated by reference.

What is claimed is:
1. A process for separating metal chlorides from chlorosilanes, the process comprising:
    filtering a suspension of metal chloride in liquid chlorosilane under pressure, in a zone which has been made inert by the absence of air and moisture, thereby forming a filter cake;
    breaking up the filter cake in a zone which has been made inert to form a granulated filter cake; and
    passing the granulated filter cake to a dissolution zone in which the metal chloride is dissolved to form an aqueous metal chloride solution.

2. The process of claim 1, wherein filtration under pressure is carried out with candle filters or filter presses.

3. The process of claim 1, which is carried out batchwise or pseudocontinuously using alternately operating filtration devices.

4. The process of claim 1, wherein the metal chloride suspension is produced from a crude gas, formed in the reaction of technical-grade silicon with hydrogen chloride, by introducing the crude gas into a circulated suspension of metal chlorides in chlorosilanes, and reducing the temperature of the crude gas to the temperature of a three-phase gas/liquid/solid mixture formed upon introduction of the crude gas into the suspension, the temperature reduction occurring partly by direct cooling which results from the vaporization of chlorosilanes and partly by indirect cooling.

5. The process of claim 4, wherein the metal chloride suspension is produced at atmospheric pressure or superatmospheric pressure up to 5.0 bar.

6. The process of claim 4, wherein the crude gas is introduced into the circulated liquid chlorosilane at a velocity such that the linear velocity of the resulting gas/liquid/solid mixture is at least 2 m/s.

7. The process of claim 6, wherein the crude gas is introduced into the metal chloride suspension at a velocity such that the linear velocity of the resulting gas/liquid/solid mixture is from 2 to 8 m/s.

8. A process for separating metal chlorides from chlorosilanes, the process comprising:

a step for filtering a suspension of metal chloride in liquid chlorosilane under inert conditions thereby forming a filter cake, a step for granulating the filter cake under inert conditions to form a granulated filter cake, and a step for dissolving the granulated filter cake in water.

9. The process of claim 8, wherein filtration under pressure is carried out with candle filters or filter presses.

10. The process of claim 8, which is carried out batchwise or pseudocontinuously using alternately operating filtration devices.

11. The process of claim 8, wherein the metal chloride suspension is produced from a crude gas, formed in the reaction of technical-grade silicon with hydrogen chloride, by introducing the crude gas into a circulated suspension of metal chlorides in chlorosilanes, and reducing the temperature of the crude gas to the temperature of a three-phase gas/liquid/solid mixture formed upon introduction of the crude gas into the suspension, the temperature reduction occurring partly by direct cooling which results from the vaporization of chlorosilanes and partly by indirect cooling.

12. The process of claim 11, wherein the metal chloride suspension is produced at atmospheric pressure or superatmospheric pressure up to 5.0 bar.

13. The process of claim 11, wherein the crude gases is introduced into the circulated liquid chlorosilane at a velocity such that the linear velocity of the resulting gas/liquid/solid mixture is at least 2 m/s.

14. The process of claim 11, wherein the crude gas is introduced into the metal chloride suspension at a velocity such that the linear velocity of the resulting gas/liquid/solid mixture is from 2 to 8 m/s.

* * * * *